(12) United States Patent
Felts (10) Patent No.: US 7,703,005 B2
(45) Date of Patent: Apr. 20, 2010

(54) METHOD TO GENERATE SCRIPTS FROM XML

(75) Inventor: David Felts, Denville, NJ (US)

(73) Assignee: BEA Systems, Inc., Redwood Shores, CA (US)

( * ) Notice: Subject to any disclaimer, the term of this patent is extended or adjusted under 35 U.S.C. 154(b) by 682 days.

(21) Appl. No.: 11/130,732

(22) Filed: May 17, 2005

(65) Prior Publication Data

US 2005/0262476 A1  Nov. 24, 2005

Related U.S. Application Data

(60) Provisional application No. 60/573,270, filed on May 21, 2004.

(51) Int. Cl.
   *G06F 17/00* (2006.01)
(52) U.S. Cl. .................. 715/234; 717/103; 717/104; 717/124; 717/136; 709/220
(58) Field of Classification Search .......... 715/515, 715/513, 517, 205, 234; 717/103, 104, 124, 717/136; 709/220
See application file for complete search history.

(56) References Cited

U.S. PATENT DOCUMENTS

| | | | | |
|---|---|---|---|---|
| 5,812,843 A * | 9/1998 | Yamazaki et al. | ........... | 718/100 |
| 6,507,856 B1 * | 1/2003 | Chen et al. | .................. | 715/205 |
| 6,681,386 B1 * | 1/2004 | Amin et al. | ................. | 717/136 |
| 6,714,219 B2 * | 3/2004 | Lindhorst et al. | ........... | 715/769 |
| 6,724,409 B1 * | 4/2004 | Maddocks et al. | .......... | 715/853 |
| 6,981,212 B1 * | 12/2005 | Claussen et al. | ............ | 715/205 |
| 6,996,781 B1 * | 2/2006 | Myers et al. | ................ | 715/763 |
| 7,013,331 B2 * | 3/2006 | Das | ........................... | 709/220 |
| 7,055,350 B2 * | 6/2006 | Bonnain et al. | ................ | 70/97 |
| 7,146,380 B2 * | 12/2006 | Schaepe et al. | ........ | 707/103 X |
| 7,260,777 B2 * | 8/2007 | Fitzsimons et al. | ......... | 715/255 |
| 7,272,822 B1 * | 9/2007 | Riggins et al. | ............. | 717/124 |
| 7,376,676 B2 * | 5/2008 | Blea et al. | .................... | 707/203 |
| 7,441,228 B2 * | 10/2008 | Otto et al. | .................... | 717/103 |
| 2003/0212797 A1 * | 11/2003 | Kuroda | ....................... | 709/227 |
| 2004/0015782 A1 * | 1/2004 | Day et al. | .................... | 715/517 |
| 2004/0054610 A1 * | 3/2004 | Amstutz et al. | ............... | 705/36 |
| 2004/0138970 A1 * | 7/2004 | Ramachandran et al. | ...... | 705/34 |
| 2004/0205562 A1 * | 10/2004 | Rozek et al. | ................ | 715/513 |
| 2004/0243277 A1 * | 12/2004 | Bonnain et al. | ............ | 700/213 |
| 2006/0004827 A1 * | 1/2006 | Stuart | ........................ | 707/102 |
| 2006/0036715 A1 * | 2/2006 | Ghattu | ....................... | 709/220 |
| 2006/0136761 A1 * | 6/2006 | Frasier et al. | ............... | 713/320 |
| 2006/0218512 A1 * | 9/2006 | Arslan et al. | ................... | 716/4 |
| 2006/0253742 A1 * | 11/2006 | Elenburg et al. | ............. | 714/38 |
| 2007/0122017 A1 * | 5/2007 | Binnig et al. | ............... | 382/128 |
| 2007/0220039 A1 * | 9/2007 | Waldman et al. | ............ | 707/102 |
| 2008/0021861 A1 * | 1/2008 | Fitzsimons et al. | ............. | 707/1 |

* cited by examiner

*Primary Examiner*—Doug Hutton
*Assistant Examiner*—Benjamin J Smith
(74) *Attorney, Agent, or Firm*—Fliesler Meyer LLP (57) ABSTRACT

An XML document can use tags such that scripts can be generated from the documents. The scripts can be start up scripts for different operating systems. For example, the same XML document can be used to produce a UNIX shell script as well as a Windows command file.

16 Claims, 4 Drawing Sheets

METHOD TO GENERATE SCRIPTS FROM XML

CLAIM OF PRIORITY

This application claims priority to U.S. Provisional Application No. 60/573,270 entitled "Method to Generate Scripts from XML", filed May 21, 2004.

BACKGROUND OF THE INVENTION

The present invention is directed to the construction of scripts such as start scripts for a server.

SUMMARY OF THE INVENTION

The present invention consists of interpreting tags and information in an XML document to produce a server start script for an operating system, the XML document includes tags which are defined to indicate information such that the XML document can be used to produce server start scripts for multiple types of operating systems; and storing the produced server start script in memory.

DETAILED DESCRIPTION

Figure 1:
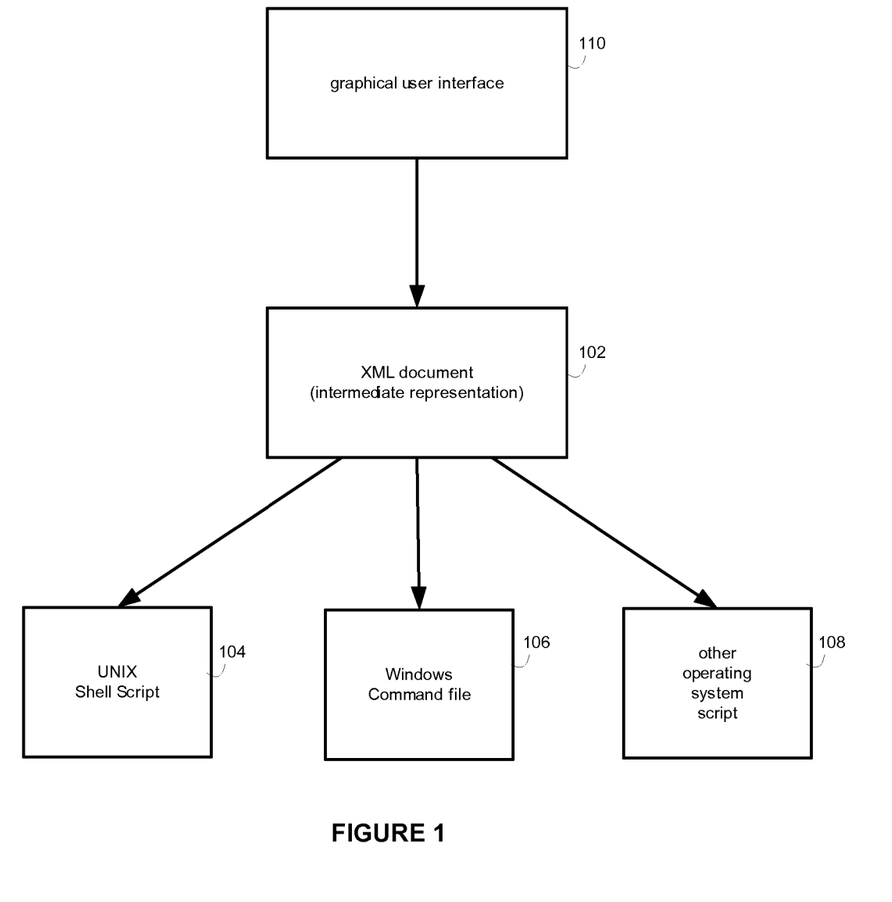
FIG. 1 is a diagram illustrating the system of the present invention.

In one embodiment of the present invention, tags and information in an eXtensible Markup Language (XML) document 102 are interpreted to produce a server start script, such as scripts 104, 106 and 108, for an operating system. The XML document 102 includes tags which are defined to indicate information so that the XML document can be used to produce server start scripts for multiple types of operating systems. Examples of XML tags and constructed script formats of one example is given below in the Script Generator Specification section. The produced server start script, such as scripts 104, 106, and 108, can be stored in memory.

The server start scripts can include UNIX® shell scripts 104, WINDOWS™ command files 106 and other operating system scripts 108. A graphical user interface 110 can be used to produce the XML document. Details of a graphical user interface of one embodiment are described below with respect to FIGS. 2A-2C. The graphical user interface 110 can be used to select the script type. WINDOWS™ and UNIX® are operating systems.

The XML document 102 can be merged with an extension XML document to produce a merged XML document from which the script is produced. The extension XML document can include tags defined for merging XML documents. Such tags can include marker tags, append tags and replace tags.

An Application Programming Interface (API) can be used to create the scripts and/or XML documents. The API allows users to design software that allows for the construction of the scripts and/or XML files.

In one embodiment, the graphical interface 110 is used to produce an intermediate representation, such as XML document 102. The intermediate representation can be such that it can be used to produce server start scripts 104, 106, and 108 for multiple types of operating systems. The intermediate representation can be stored in memory.

The graphical user interface can allow the dragging and dropping of elements for the construction of the XML document. The graphical user interface can include selectable elements for the construction of the XML documents. The selectable elements can be selectable from a menu of the graphical user interface. The graphical user interface can allow the selection of the script for the correct operating system.

Figure 2A:
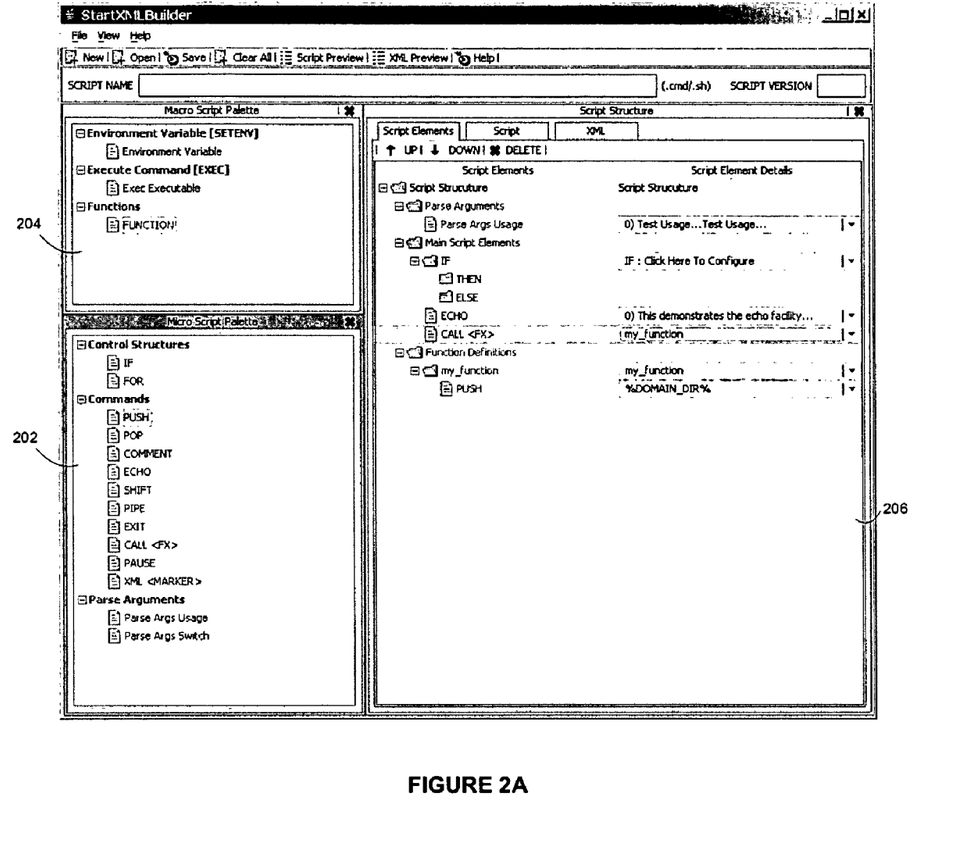
FIGS. 2A-2C are diagrams that illustrate graphical user interfaces of one embodiment of the present invention.
Figure 2B:
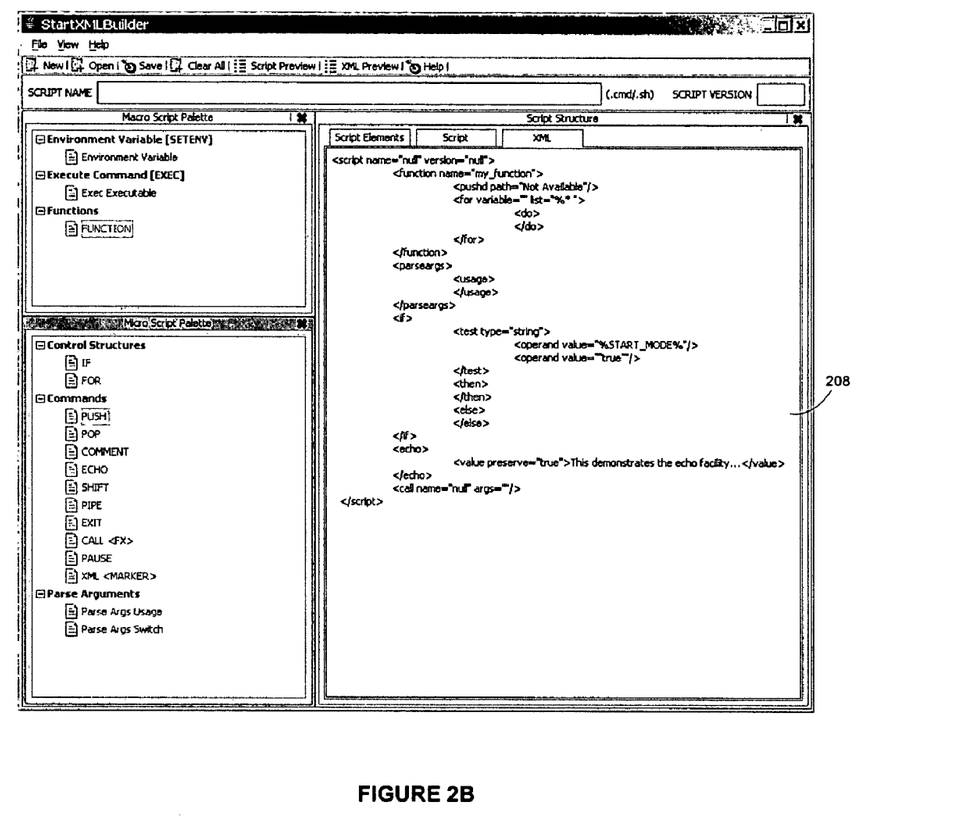
Figure 2C:
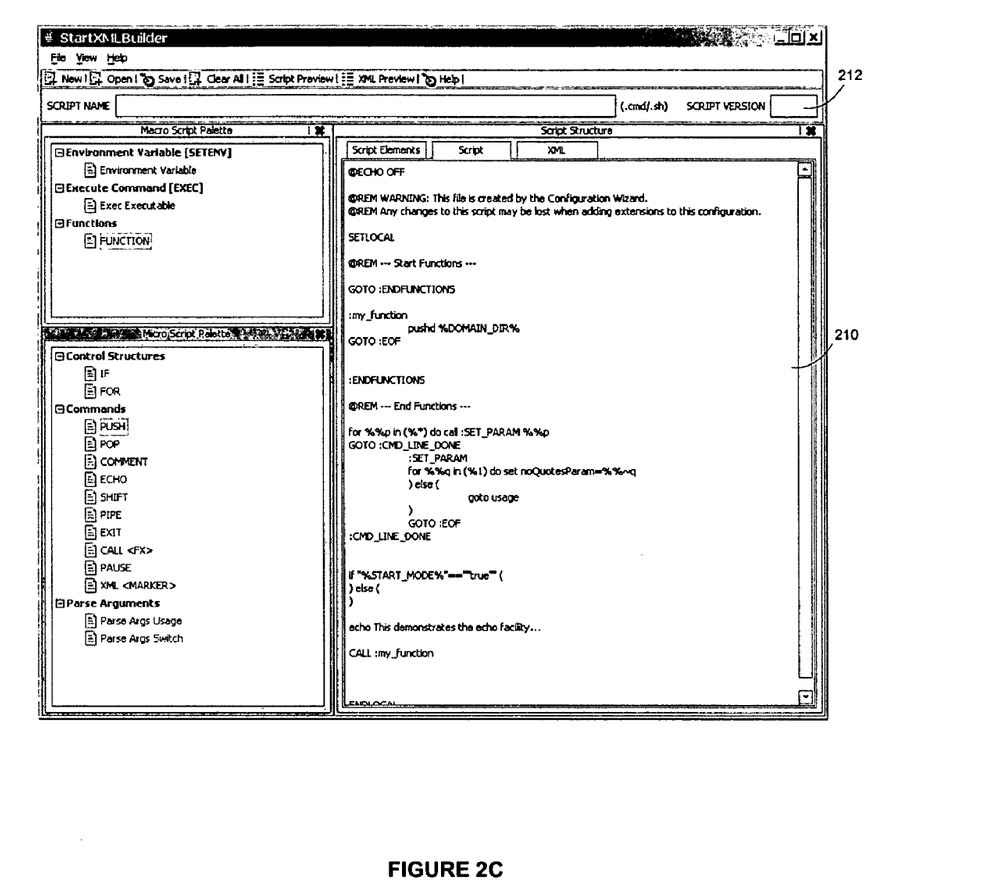

FIGS. 2A-2C show a graphical user interface (GUI) of one embodiment. As shown in FIG. 2A, a number of menus or palettes can be used for selecting a selectable element. For example, the menu 202 includes the selectable Control Structures, such as IF and FOR; Selectable Commands, such as PUSH, POP, COMMENT, ECHO, SHIFT, PIPE, EXIT, CALL (function), PAUSE, and XML marker; and selectable Parse Arguments such as parse arguments usage and parse arguments switch. Menu 204 allows a selection of an Environmental Variable, Execute Commands and Functions. Menu region 206 has the Script Elements tab selected. The script elements menu 206 indicates the script elements which can be used for producing the XML document from which the script or scripts can be produced. In this example, pull down menus are used for selecting elements within the script element structure. The script structure includes the parse arguments, which can parse the arguments passed to the script, the main script elements which include commands such as IF-THEN statements, echoes and function calls; and functional definitions. The functions can be called from within the main script portion.

FIG. 2B illustrates the XML representation menu for the GUI of FIG. 2A. This XML representation is in the menu area 208 with the XML tab selected. The XML script with its tags and other information can be automatically constructed by the GUI or other software from the user input to the script element server 206 of FIG. 2A. From the XML document, the script or scripts can be produced such as that that shown in FIG. 2C. When the script tab is selected, menu 210 displays with the produced script. The type of script to be produced or displayed be selected from a pull down menu, such as the pull down menu 212.

The construction of scripts from the XML can be automated by defining the XML tag structure (i.e., e.g., the document type definition DTD or XML schema) such that the XML document is sufficient to produce each type of script desired to be produced. In the script generator specification example given below, the XML document structure is such that both a WINDOWS™ command file script and a UNIX® shell script can be produced. The tags are used to identify information that can be plugged into the scripts automatically.

For example as shown below in the script generator specification example, XML for the IF-THEN statements can look as follows:

```
<if>
    <test type="error|string|file|directory|variable" not="false|true" case="true|false -- WINDOWS ONLY">
        <operand value="op1" preserve="true|false"/>
        <operand value="op2" preserve="true|false"/>
    <test/>
    <then>
        ... execute command(s) when true ...
    </then>
    <else>
        ... execute command(s) when false ...
    </else>
</if>
```

The <if> and </if> tags indicate the whole if-then section. The <test> and </test> tags indicates the test to be done. The type is a variable to indicate the type of test. The <then> and </then> tags indicate the command or commands to execute if the test is true; and the <else> and </else> tags indicate the command or commands to execute if the test is true.

For example, if the type is string, not is false, and the case is false, script for checking if one string equals another string is given by:

if "string1"=="string2" command [else expression]

for a WINDOWS™ command file; and if ["string1"="string2"] then; else;

for a UNIX® shell script Where "string1" is obtained from "op1" and "string2" is obtained from "op2".

The script generator specification example below is merely one non-limiting example of a specification of the script generator. A number of different representations for the XML can also be used as long as the desired types of constructed scripts can be produced.

Script Generator Specification Example for a UNIX shell script. Where "string1"is obtained from "op1" and "string2"is obtained from "op2".

```
************** SCRIPT AND SCRIPTS ********************
The "script" element encapuslates the defintion of a script.
This element has several attributes:
  name: The name the script will have after we create it.
        It should be assumed that either ".cmd" or ".sh"
        will be appended to this based on which platform
        the script is being created for.

version: This is just for versioning purposes.

scope: This is the variable scope of the entire script
         as exmplained in the "SET" section type: This value describes the type of script this is.
        It's valid values are "base" or "ext".
        base: This means that the script is a standalone script
              that is not meant to be merged into any existing
              script with the same name, but rather overwrite.
        ext: This means that the script is meant to extend an
             existing script with the same name if it exists.
             If it does exist than an attempt will be made to
             merge the two scripts together, if it doesn't
          it will be ignored.

The XML document can contain a single script or multiple.
If you have only one start script you may use:

<script name="scriptname" version="3">
</script> as your root tags.

If you wish to have multiple scripts you must wrap each
script with the "scripts" root tag.
<scripts>
  <script name="scriptname1" version="3">
  </script>

<script name="scriptname2" version="3">
  </script>
</scripts>

************** SCRIPT AND SCRIPTS ********************
```

```
************* SET *******************
Set script local variable:
  Windows:
    SETLOCAL
    SET NAME=VALUE
    ENDLOCAL
  Unix:
    name=value Set external script variables
  Windows:
    SET NAME=VALUE
  Unix:
    export name=value Shortening paths to remove space on Windows using a for loop
(only applies to paths with one value!!!):
  for %%i in ("%NAME%") do set NAME=%%~fsi

XML:

The SETLOCAL/ENDLOCAL & export use will be set at the root <script/>
element using
  the "scope" attribute because of the windows limitation:

<script name="scriptname(.cmd/.sh auto appended)" version="3"
scope="local|global" >

The vars are set using the <setenv/> and <value/> elements. The
delim lets you specify a
  different delimiter to use than the current platform's default.
Multiple <value/>
  elements means you are working with a path and a path seperator will
be
  appended between each value after the equals sign. The "preserve"
attribute
  tells us wether to convert the contents to their platform specific
values
  or to leave them as is. If the mergeprev attribute is "true" then
the value
  of the current <value> element will be appended to the previous
without
  using a delimiter. This is useful when you have part of a string
that needs
  to be preserved and another part that needs to be converted:

<setenv name="CLASSPATH" shorten="true -- WINDOWS ONLY"
scope="local|global -- UNIX ONLY" delim=" ">
    <value>%WL_HOME%\server\lib\webservices.jar</value>
    <value>%SAMPLES_HOME%\server\examples\build\clientclasses</value>
    <value preserve="true|false" mergeprev="true|false">don't touch me
and merge me w/ prev w/o a delim</value>
  </setenv>
```

************ SET *****************

************ IF/ELSE *****************
Checking error level of previously executed command:
  Windows:
    if [not] errorlevel number command [else expression]
  Unix:
    if [ $? -eq(ne) errorlevel ] then; else;...

Checking if one string equals another:
  Windows:
    if [not] "string1"=="string2" command [else expression]
  Unix:
    if [ "string1" (!)= "string2" ] then; else;...

Checking a file exists:
  Windows:
    if [not] exist filename command [else expression]
  Unix:
    if [ (!) -f filename ] then; else;...

Checking a directory exists:
  Windows:
    if [not] exist directory command [else expression]
  Unix:
    if [ (!) -d directory ] then; else;...

Checking if one string equals another with case insensitivity:
  Windows:
    if [/i] string1 compare-op string2 command [else expression]
  Unix:
    !! -- can't be done -- !!

Checking if a variable has been defined:
  Windows:
    if defined variable command [else expression]
  Unix:
    if [ ${variable} ] then; else;...

XML:
  The IF structures use the <if/> element. The "type" attribute tells us what
  kind of evaluation will be taking place.

<if>
     <test type="error|string|file|directory|variable" not="false|true" case="true|false -- WINDOWS ONLY">
        <operand value="op1" preserve="true|false"/>
        <operand value="op2" preserve="true|false"/>
     <test/>
     <then>
        ... execute command(s) when true ...
     </then>
     <else>

```
      ... execute command(s) when false ...
    </else>
  </if>
```

\*\*\*\*\*\*\*\*\*\*\*\*\*\* IF/ELSE \*\*\*\*\*\*\*\*\*\*\*\*\*\*\*\*\*\*\*\*

\*\*\*\*\*\*\*\*\*\*\*\*\* PUSH/POP \*\*\*\*\*\*\*\*\*\*\*\*\*\*\*\*\*\*\*\*
Store current directory and cd to new location then return to original directory:
```
  Windows:
    pushd path
    popd
  Unix:  -- must use functions and a simulated array to accomplish...
    BP=100
    SP=$BP pushd()
    {
      if [ -z "$1" ]
      then
        return
      fi SP=`expr $SP - 1`
      eval _stack$SP=`pwd`
      cd $1
      return
    } popd()
    {
      if [ $SP -eq $BP ]
      then
        return
      fi eval cd \${_stack$SP}
      SP=`expr $SP + 1`
      return
    }

XML:
  <pushd path=""/>
  <popd/>
```

\*\*\*\*\*\*\*\*\*\*\*\*\* PUSH/POP \*\*\*\*\*\*\*\*\*\*\*\*\*\*\*\*\*\*\*\*

\*\*\*\*\*\*\*\*\*\*\*\*\* ECHO \*\*\*\*\*\*\*\*\*\*\*\*\*\*\*\*\*\*\*\*
Turning echo on and off in Windows is different than that of Unix.
Unix scripts always have echo off, while Windows scripts have the option
to turn the echo on or off. In Unix the "echo on" effect can be used if you
execute the script via "sh -v script.sh". For that reason Windows scripts will always be generated with "echo off" for consistency with Unix.

Echo string to the terminal:
  Windows:
    ECHO message    -- escape chars ^( ^)
  Unix:
    echo "message" -- escape chars \"

SEE REDIRECTION!

XML:
  Echo's are done using the <echo/> element. The echo element can either specify
  the message via the "message" attribute OR via nested <value/> elements (Ant style).
  The nested elements are useful when performing multi-lined echos.
  You can also optionally specify redirects to files or streams using the <redirect/> element.
  If the append attribute is "true" in the redirect element than all the messages will
  be appended(>>) to the specified file. If "false" then the first message will overwrite
  any existing file (>) and any subsequent messages will be appended(>>).

```
<echo message="text">
  <value>text1</value>
  <value>text2 message2</value>
  <redirect file="filename" append="true|false"/>
</echo>
```

************ ECHO ******************

************ SHIFT ******************
Causes the arguments passed into the script to shift one position.
  Windows:
    SHIFT   -- %2 becomes %1
  Unix:
    shift   -- $2 becomes $1

XML:
  <shift/>
************ SHIFT ******************

************ EXECUTION ******************
Executing another script from this script:
  Windows:
    CALL script.cmd
  Unix:
    (. ./)script.sh Executing a program from this script:
  Windows:
    (start (cmd /c)) program arg1 arg2...
  Unix:

```
    program arg1 arg2... (&)
```

SEE REDIRECTION!

XML:
```
  <exec type="script" name="execname(for reference only)">
    <cmd start="${WL_HOME}/common/bin/commEnv" />  -- leave off the
.cmd and .sh we will add it based on platform...
    <params>
        <value>USE_CURRENT_JAVA_HOME</value>
    </params>
  </exec>

<exec type="program" name="execname(for reference only)">
    <cmd start="%JAVA_HOME%\bin\java" end="weblogic.Server"
background="true" min="false" source="false"/>
    <params>
        <value>com.pointbase.net.netServer</value>
        <value preserve="true">/port:9092</value>
        <value preserve="true">/d:3</value>
        <value preserve="true">/pointbase.ini="pointbase.ini"</value>
    </params>
    <params type=post>
        <value>-log=test.log</value>
    </params>
    <redirect file="pointbase.log" instream="2" outstream="1"/>
  </exec>
```
*********** EXECUTION *****************

*********** REDIRECTION *****************
Redirection on Windows and Unix works the same way:

(>) sends the output of a command to a file or a device
  i.e. echo "message" > message.txt (>>) appends the output of a command to a file
  i.e. echo "message" >> message.txt (>&) redirects the output from one of the default I/O streams (stdout, stdin, stderr) into another.
  i.e. echo "message" 2>&1
  Redirects any error messages from the processing of command from the screen to the standard file output.
  Where 0 is Stdin
  Where 1 is Stdout
  Where 2 is Stderr You can also redirect all streams to null on both win and unix:
Windows uses NUL:
  i.e. echo "message" > NUL Unix uses /dev/null:
  i.e. echo "message" > /dev/null

XML:

```
  <redirect file="filename" append="true|false" tostream="2"
fromstream="1" null="true"/>

************* REDIRECTION *******************

************* PIPES *******************
Pipes on Windows and Unix work the same way:

command | command2

XML:
  Only <exec/> and <echo/> elements are valid when using pipes.
  You can place as many exec/echos as you like inside a pipe section
  and each one will be piped into the next.

<pipe>
    <echo message="SHUTDOWN FORCE;"/>
    <exec type="script|program" name="execname(for reference only)">
      <cmd start="%JAVA_HOME%\bin\java"/>
      <params>
          <value>com.pointbase.tools.toolsCommander</value>
          <value>com.pointbase.jdbc.jdbcUniversalDriver</value>
          <value>jdbc:pointbase:server://%HOST%:%PORT%/%DBNAME%
%USERNAME% %PASSWORD%</value>
      </params>
    </exec>
  </pipe>

************* PIPES *******************

************* FUNCTIONS *******************
There are no actual "functions" in windows, but using a mix of CALL
and GOTO it
can be accomplished.

Defining a function:
  Windows: -- these are probably best kept at the end of the script
    :NAME
      ... execution steps ...
      GOTO EOF
  Unix: -- these MUST be at the begining of the script
    name()
    {
       ... execution steps ...
       return
    }

Calling a function:
  Windows:
    CALL :NAME ARGS
  Unix:
    name args

XML:
  Regardless of where a function is defined in the XML Document when
``` the script is created it will be located according to which type
of script is being created. (Windows = bottom, Unix = top)

Defining a function:
    <function name="functionName">
      ... execution steps ...
    </function>

Calling a function:
    <call name="functionName" args="arg values"/>
*********** FUNCTIONS *****************

*********** FOR LOOPS *****************
The basic for loops on Windows and Unix are similar:
On each iteration of the loop the named "variable" is set
with the next value in the "set/list" and the "command" is executed.

Windows:
    for %%variable in (set/list) do command [command-parameters]

Unix:
    for { variable } in { set/list }
    do
      ... command(s) ...
    done XML:
  The <for/> element will support multiple commands, however, on
  windows we will have to implicitly create a function to execute
  if the user specifies more than one command under windows.

<for variable="name" list="list items">
    <do>
      ... command(s) ...
    </do>
  </for>

*********** FOR LOOPS *****************

*********** EXIT *****************
Allows script to exit when specified:
  Windows:
    Hard:
      EXIT
    Soft:
      GOTO :EOF
  Unix:
    exit XML:
  <exit hard="true|false"/>
*********** EXIT *****************

*********** PARSE COMMAND LINE ARGS *****************
This allows the user to have the script parsing command line arguments that were passed in.
A "usage" can optionally be defined which prints the usage and exits:
  Windows:
    FOR %%p IN (%*) DO CALL :SET_PARAM %%p
    GOTO :CMD_LINE_DONE
        :SET_PARAM
        if /i "%1" == "arg1" (
          ARG1=true
          GOTO :EOF
        )
        if /i "%1" == "arg2" (
          ARG2=""
          GOTO :EOF
        )
        if /i "%1" == "arg3" (
          ECHO arg3
          GOTO :EOF
        ) ELSE (
          GOTO USAGE
        )
        GOTO :EOF
    :CMD_LINE_DONE
  Unix:
    while [ $# -gt 0 ]
    do
        case $1 in
        arg1)
            ARG1=true
            ;;
        arg2)
            ARG2=""
            ;;
        arg3)
            echo "arg3"
            ;;
        *)
            usage
            ;;
        esac
        shift
    done XML:
  You can nest just about any type of element under the <arg/> element.
  So if a command line argument matches the one in the "name" attribute
    then you can set a var, echo a string, do an exec, etc...
  The <usage/> is an optional element. If it's defined then if an unknown
    argument is passed to the script it spits the usage and exits. If it is
    not defined than unknown args would be ignored and execution would continue.

```
    <parseargs>
      <usage>
        <value>text1</value>
        <value>text2 message2</value>
      </usage>

<arg switch="arg1switch" name="arg1" default="false">
        <setenv name="ARG1">
          <value>true<value>
        </setenv>
      </arg>

<arg switch="arg1switch" name="arg2" default="false">
        <setenv name="ARG2">
          <value><value>
        </setenv>
      </arg>

<arg switch="arg1switch" name="arg3" default="false">
        <echo message="arg3"/>
      </arg>
    </parseargs>
************* PARSE COMMAND LINE ARGS *******************

************* COMMENTS *******************
Windows:
  @REM comment
Unix:
  # comment XML:
  <comment message="the comment"/>

OR
  <comment>
    <value>the comment1</value>
    <value>the comment2</value>
  </comment>
************* COMMENTS *******************

************* PAUSE *******************
Pauses a script awaiting a user to hit any key.
  Windows:
    pause
  Unix:
    read var XML:
  <pause/>
************* PAUSE *******************

************* MARKER *******************
Markers are not related to any particular operating system. These
are special elements in the XML which are used when merging
``` two scripts together. When merging XML's we only allow you to insert, append, replace, or merge the setenv and exec type elements. If the element that the marker refers to exists in the base XML then the marker should be placed before the element in the XML. If the element does not yet exist in the base XML then the marker should be placed at the location you would wish the element to be added if the extension
contains it.

XML:
```
  <marker name="CLASSPATH" type="setenv|exec" action="insert|append|replace|merge" />
************* PAUSE ******************
```

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method of generating server scripts for use with different operating systems, comprising:
   displaying, at a computer which includes a processor and a memory, a graphical user interface which includes menus and other graphical elements, and which allows for a selection of elements to define functions of a server script;
   using the selection of elements to produce an XML document in the memory of the computer, wherein the XML document includes tags and information that describe the functions of the server script in an intermediate format that is independent of operating systems with which the server script may be ultimately used;
   receiving an instruction to generate a server script for use with a particular operating system;
   interpreting the tags and information in the XML document to produce a server script specific to that particular operating system, including using the tags to plug in information specific to that particular operating system;
   storing the produced server script in memory; and
   wherein an instruction is received to generate a server script for use with a different operating system, and wherein the XML document is subsequently used without modification to generate a server script for use with the different operating system, including using the tags to plug in information specific to the different operating system.

2. The method of claim 1, wherein a graphical user interface is used to select a script type.

3. The method of claim 1, wherein the XML document is merged with an extension XML document to produce a merged XML document from which the server script is produced.

4. The method of claim 3, wherein the extension XML document includes tags defined for merging XML documents.

5. A computer readable storage medium containing a computer program that interacts with a XML document that includes tags which are defined to indicate information, the XML document is used by the computer program to produce server start scripts for multiple types of operating systems, wherein the computer program includes code, which when read and executed by the computer, performs the steps comprising:
   displaying a graphical user interface which includes menus and other graphical elements, and which allows for a selection of elements to define functions of the server start scripts;
   using the selection of elements to produce an XML document in the memory of the computer, wherein the XML document includes tags and information that describe the functions of the server start scripts in an intermediate format that is independent of the operating systems with which the server start scripts may be ultimately used;
   receiving an instruction to generate a server start script for use with a particular operating system;
   interpreting the tags and information in the XML document to produce a server start script specific to that particular operating system, including using the tags to plug in information specific to that particular operating system;
   storing the produced server start script in memory;
   receiving a subsequent instruction to generate a server start script for use with a different operating system, and wherein the XML document is subsequently used without modification to generate a server start script for use with the different operating system, including using the tags to plug in information specific to the different operating system; and
   wherein the server start scripts are used to start a server on different machines running the different operating systems.

6. The computer readable storage medium of claim 5, wherein a graphical user interface is used to select a script type.

7. The computer readable storage medium of claim 5, wherein the XML document is merged with an extension XML document to produce a merged XML document from which the server start script is produced.

8. The computer readable storage medium of claim 7, wherein the extension XML document includes tags defined for merging XML documents.

9. A method of generating server scripts for use with different operating systems, comprising:
   displaying a graphical user interface which includes menus and other graphical elements, and which allows for a selection of elements to define functions of the server scripts;
   using the selection of elements to produce an XML document in the memory of the computer, wherein the XML document includes tags and information that describe the functions of the server start scripts in an intermediate format that is independent of the operating systems with which the server start scripts may be ultimately used;
   receiving an instruction to generate a server start script for use with a particular operating system;

interpreting the tags and information in the XML document to produce a server start script specific to that particular operating system, including using the tags to plug in information specific to that particular operating system;

storing the intermediate format representation in memory; and receiving a subsequent instruction to generate a server start script for use with a different operating system, and wherein the XML document is subsequently used without modification to generate a server start script for use with the different operating system, including using the tags to plug in information specific to the different operating system.

10. The method of claim 9, wherein the intermediate format is an XML document.

11. The method of claim 9, wherein the graphical interface allows the dragging and dropping of elements for the construction of the XML document.

12. The method of claim 9, wherein selectable elements are selectable from a menu of the graphical interface.

13. The method of claim 9, wherein the graphical interface allows the selection of the server start script for the correct operating system.

14. The method of claim 1, wherein the server script can be generated from the intermediate format either in the form of a shell script or a command file, depending on the particular operating system and the format of server script needed for that particular operating system.

15. The computer readable storage medium of claim 5, wherein the server script can be generated from the intermediate format either in the form of a shell script or a command file, depending on the particular operating system and the format of server script needed for that particular operating system.

16. The method of claim 9, wherein the server script can be generated from the intermediate format either in the form of a shell script or a command file, depending on the particular operating system and the format of server script needed for that particular operating system.

* * * * *